(12) United States Patent
Schudt et al.

(10) Patent No.: US 9,746,071 B2
(45) Date of Patent: Aug. 29, 2017

(54) PRESSURE CONTROL VALVE INCLUDING A COMPENSATING CHAMBER

(71) Applicant: Robert Bosch GmbH, Stuttgart (DE)

(72) Inventors: Klaus Schudt, Nordheim (DE); Erwin Mueller, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/571,467

(22) Filed: Dec. 16, 2014

(65) Prior Publication Data

US 2015/0176700 A1 Jun. 25, 2015

(30) Foreign Application Priority Data

Dec. 19, 2013 (DE) ........................ 10 2013 226 615

(51) Int. Cl.
*F16K 31/06* (2006.01)
*F16H 61/02* (2006.01)
*F16H 61/06* (2006.01)

(52) U.S. Cl.
CPC ..... *F16H 61/0206* (2013.01); *F16H 61/0251* (2013.01); *F16H 61/065* (2013.01); *F16K 31/0613* (2013.01); *F16H 2061/0258* (2013.01); *Y10T 137/86622* (2015.04)

(58) Field of Classification Search
CPC ..... Y10T 137/86622; Y10T 137/86694; Y10T 137/86702; Y10T 137/8671; Y10T 137/86686; Y10T 137/7904; F16H 61/065; F16H 61/0206; F16H 61/0251; F16H 2061/0258; F15B 13/0442; F15B 13/0402; F15B 13/0835; F16K 11/0716; F16K 31/0613; G05D 16/2013

USPC .............. 137/625.2, 625.27, 625.65, 625.67, 137/625.68, 625.69
See application file for complete search history.

(56) References Cited

U.S. PATENT DOCUMENTS

| | | | | |
|---|---|---|---|---|
| 3,519,312 A | * | 7/1970 | Cruse | B60T 15/02 137/625.67 |
| 3,661,183 A | * | 5/1972 | Komaroff | F16K 31/0631 137/625.65 |
| 4,535,816 A | * | 8/1985 | Feder | F16H 61/0251 137/625.65 |
| 4,538,645 A | * | 9/1985 | Perach | F16K 31/0606 137/625.65 |
| 4,579,145 A | * | 4/1986 | Leiber | F16H 61/0251 137/625.65 |
| 4,624,285 A | * | 11/1986 | Perach | F16K 31/0606 137/625.65 |
| 4,966,195 A | * | 10/1990 | McCabe | F16H 61/0251 137/625.61 |

(Continued)

FOREIGN PATENT DOCUMENTS

DE 103 25 070 12/2003
DE 10 2010 039917 3/2012

*Primary Examiner* — Craig J Price
(74) *Attorney, Agent, or Firm* — Norton Rose Fulbright US LLP; Gerard Messina

(57) ABSTRACT

A pressure control valve, in particular for an automatic transmission in a motor vehicle, including a housing and including a control piston situated in the housing, the control piston being actuatable by an armature situated in a magnet chamber of a pole tube, the magnet chamber being hydraulically connected to a compensating chamber provided in the housing, which is delimited, in particular by a lateral surface of a solenoid coil and the housing.

10 Claims, 3 Drawing Sheets

(56) References Cited

U.S. PATENT DOCUMENTS

| | | | | |
|---|---|---|---|---|
| 4,971,116 A * | 11/1990 | Suzuki | .................. | H01F 7/1638 |
| | | | | 137/625.65 |
| 5,004,440 A * | 4/1991 | Suzuki | ............... | G05D 16/2013 |
| | | | | 137/625.65 |
| 5,014,747 A * | 5/1991 | Suzuki | ............... | G05D 16/2013 |
| | | | | 137/625.65 |
| 5,259,414 A * | 11/1993 | Suzuki | ................ | F15B 13/0402 |
| | | | | 137/625.65 |
| 5,853,028 A * | 12/1998 | Ness | .................. | G05D 16/2013 |
| | | | | 137/625.65 |
| 5,855,228 A * | 1/1999 | Perach | ................ | F15B 13/0405 |
| | | | | 137/269 |
| 5,975,139 A * | 11/1999 | Carroll | ................. | F02M 47/027 |
| | | | | 137/625.6 |
| 6,397,891 B1 * | 6/2002 | Neuhaus | ............ | G05D 16/2013 |
| | | | | 137/625.65 |
| 8,684,038 B2 * | 4/2014 | Schudt | ................ | F16K 31/0613 |
| | | | | 137/625.68 |
| 8,839,819 B2 * | 9/2014 | Holmes | ............... | F16K 11/0716 |
| | | | | 137/625.68 |
| 8,973,611 B2 * | 3/2015 | Schudt | ................ | F15B 13/0442 |
| | | | | 137/625.27 |
| 8,984,874 B2 * | 3/2015 | Shimizu | .................. | F04B 17/03 |
| | | | | 60/428 |
| 2001/0052584 A1 * | 12/2001 | Niimi | .................. | F16K 31/0613 |
| | | | | 251/129.15 |
| 2002/0195151 A1 * | 12/2002 | Erickson | ............. | F16K 31/0613 |
| | | | | 137/625.65 |
| 2010/0139795 A1 * | 6/2010 | Holmes | ............... | F16K 11/0716 |
| | | | | 137/625.64 |
| 2012/0168274 A1 * | 7/2012 | Mills | ................... | F16H 61/0251 |
| | | | | 192/85.63 |

* cited by examiner

A - A

PRESSURE CONTROL VALVE INCLUDING A COMPENSATING CHAMBER

RELATED APPLICATION INFORMATION

The present application claims priority to and the benefit of German patent application No. 10 2013 226 615.4, which was filed in Germany on Dec. 19, 2013, the disclosure of which is incorporated herein by reference.

FIELD OF THE INVENTION

The present invention relates to a pressure control valve, in particular for an automatic transmission in a motor vehicle.

BACKGROUND INFORMATION

In modern automobile automatic transmissions, hydraulically actuated clutches are used to change gears. In order for these shift operations to occur smoothly and unnoticed by the driver, it is necessary to adjust the hydraulic pressure on the clutches according to predefined pressure ramps with the maximum possible pressure precision. For this purpose, electromagnetically actuated pressure control valves are used. These may be configured as either seat valves or slide valves. Both configurations normally include three hydraulic connections, for intake, control pressure and return flow. In the case of slide valves, an axially displaceable control piston connects openings, for example, situated radially in a sliding sleeve, which are fluidically, in particular, hydraulically, connected, to an intake connection, to a control pressure connection and to a return flow connection. In this arrangement, the control pressure connection may be axially situated, for example, whereas the intake connection and the return flow connection are radially situated. In order to ensure the pressure regulating function of slide valves, it is necessary for the control piston to be able to carry out its axial movement largely undamped.

In particular, if the end faces of a control piston come into contact with hydraulic oil, the axial movement of the control piston may result in a so-called "pumping" of hydraulic oil through the control piston. Consequently, oil is displaced by the movement of the control piston or, in turn, oil is drawn in due to a resulting vacuum. Pressure control valves in automatic transmissions are normally installed in the hydraulic oil reservoir or in the so-called "oil sump" of the automatic transmission. During the operation of automatic transmissions, in particular, ferromagnetic particles form in conjunction with the friction of the transmission gears as a result of the abrasion of the gears. In the hydraulic oil reservoir, such ferromagnetic particles and other dirt particles may lead to functional impairments or malfunctions. Thus, for example, the guidance of the control piston or the electromagnetic actuation of the control piston may be adversely affected due to the contaminants. In particular, ferromagnetic particles may accumulate in this case in the area of the magnetic poles.

Various approaches are known for ensuring the pressure regulating function of slide valves and for minimizing the entry of dirt into a pressure control valve. A slide valve is believed to be understood from DE 10 2010 039 917 A1, whereby a push rod of the pressure control valve is sealingly, but axially displaceably, guided in a bearing bush. A slide valve, in which a diaphragm is provided between an actuating rod and the valve slide in order to ensure a flow medium sealing between two housing halves, is discussed in DE 103 25 070 A1.

SUMMARY OF THE INVENTION

The problem underlying the present invention is solved by a pressure control valve having the features of claim 1. Advantageous refinements are specified in the subclaims. Features important to the present invention are also found in the following description and in the drawings, whereby the features, when taken alone and in different combinations, may be important for the present invention, without further explicit reference being made thereto.

A pressure control valve according to the present invention includes a housing and a control piston situated in the housing, the control piston being actuatable by an armature situated in a magnet chamber of a pole tube. According to the present invention, it is provided that the magnet chamber is hydraulically connected via a compensating channel to a compensating chamber in the housing, which is delimited by a solenoid coil and the housing, in particular, by a lateral surface of the solenoid coil and the housing. The lateral surface in this case is formed, in particular, by an outer winding layer of the solenoid coil. The housing has advantageously a pot-shaped configuration in the area of the compensating chamber. A pole tube is understood to mean a closed arrangement in the interior of a winding carrier of the solenoid coil, in which the magnetic poles generating the axial force and, respectively, the armature are situated. A filtering effect in the pressure control valve may be provided in the compensating chamber, whereby on the one hand particles are able to settle due to gravity, and whereby ferromagnetic particles may adhere in the area of the magnetized inner wall of the housing. Thus, with the present invention, a pressure control valve having a slide configuration is obtained, which is able to prevent dirt particles from adversely affecting the function of the pressure control valve in a simple and cost-effective manner.

One advantageous embodiment of the present invention provides that an end face on the armature side of the control piston is hydraulically connected to the magnet chamber. Due to the connection of the magnet chamber with the compensating chamber, the end face of the control piston on the armature side is consequently also hydraulically connected to the compensating chamber. The result in this case is a pumping of the control piston, which may be in the direction of the compensating chamber.

It is also provided that the housing has a multi-part configuration, in particular, a two-part configuration and, in particular, is composed of a hydraulic housing and a magnet housing. Here, the hydraulic components of the pressure control valve such as, for example, the supply connection, the return flow connection to the hydraulic oil reservoir, the working connection, the control piston and the sliding sleeve may be situated in the hydraulic housing. In contrast, the electromagnetic components such as, for example, the pole tube, the armature, the solenoid coil, etc., may be situated in the magnet housing. The magnet housing in this case has, in particular, a pot-shaped configuration.

In order to ensure a ventilation of the magnet chamber and the compensating chamber, the compensating chamber is hydraulically connected via an opening to an outer housing side. A simple manufacturing approach has proven to be that of providing as an opening a breakthrough of the electrical connecting plug of the pressure control valve. The opening in this case may be provided on the side of the compensating chamber which faces away from the compensating channel. Consequently, hydraulic oil is able to flow via the compensating channel and the compensating chamber through the opening into the hydraulic oil reservoir. Due to the connection of the end face of the control piston on the armature side to the magnet chamber, which, in turn, is connected via the compensating channel to the compensating chamber, which via the opening, is fluidically, in particular, hydraulically, connected to the hydraulic oil reservoir, a largely undamped movement of the control piston and of the armature may be ensured. Thus, an impact on the pressure control function by so-called "pumping" may be largely avoided.

The pressure control function is implemented in that the control piston of the valve in an open position hydraulically connects a working connection or control pressure connection to the supply connection and separates it hydraulically from a return flow connection. In the non-activated state, i.e., when the coil of an electromagnetic actuation device is de-energized, the armature thereof moves through the coil spring installed on the magnet side in the direction of the opening and moves the control piston in the direction of an opened end position of the pressure control valve. In this way, the first section of the control piston unblocks the supply pressure opening and the pressure medium flows into an annulus space delimited by the sliding sleeve and the control piston. Since, at the same time, the third section of the control piston separates the return flow opening from the annulus space, the pressure prevailing at the supply connection is also present at the working connection.

When the coil is energized, the electromagnetic force acts against the restoring force of the coil spring on the magnet side, which has deflected the control piston toward the end face. The control piston is moved by the control pressure present at the piston end face back into the closed end position. The control piston in the closed end position seals the supply pressure opening and at the same time unblocks the return flow opening. Because tank pressure is present in the return flow opening which is lower than the working pressure prevailing in the annulus space, pressure medium flows via the return flow opening to the return flow connection.

Another advantageous embodiment of the pressure control valve provides that the compensating channel is delimited, at least in sections, by a groove in the hydraulic housing and in the pole tube.

In this case, in particular the groove may extend in an L-shape, at least in sections, in parallel to a median longitudinal axis of the control piston and on an end face of the hydraulic housing on the armature side at least in sections radially, perpendicularly to the median longitudinal axis of the control piston. The groove may be configured to have a U-shaped or a semi-circular cross section. The pole tube may then include an annular flange facing the control piston. The compensating channel in this case is formed by the L-shaped groove and the annular flange, as well as an end face of the pole tube on the control piston side.

It is also beneficial if the groove is cast or injection molded into the hydraulic housing. In this case, the groove may be particularly advantageously manufactured in conjunction with an injection molding process.

Another advantageous embodiment of the present invention provides that the compensating channel is configured as a radial transverse bore in the pole tube. In this case, a groove need not be provided in the hydraulic housing. A radial transverse bore in the pole tube, which connects the magnet chamber to the compensating chamber, is very simple to manufacture.

It is particularly helpful if the compensating channel is situated radially upwardly during operation. A radially upward arrangement of the compensating channel may ensure that air, which has accumulated in the pole tube or in the magnet chamber, is able to escape upwardly. Thus, a ventilating function of the magnet chamber may be provided by the compensating channel, and it may be ensured that the magnet chamber is filled with oil. This is particularly advantageous for a constant dynamic behavior of the pressure control valve.

It has also proven advantageous if the cross section of the channel is selected to be not too large, so that no additional larger particles are able to pass into the magnet chamber as a result of the residual movement of oil. It is also advantageous if the cross section of the compensating channel is selected to be not too small, so that the ventilating function of the compensating channel is not adversely affected. In particular, in this case the compensating channel may have a hydraulic diameter of 0.3 mm to 2 mm. The hydraulic diameter in this case is defined as $d_h=4\ A/U$. A is the cross sectional surface of the compensating channel, U representing the size of the cross section of the compensating channel.

Additional details and advantageous embodiments of the present invention result from the following description, with reference to which the specific embodiment shown in the figures is described and explained.

DETAILED DESCRIPTION

Figure 1:
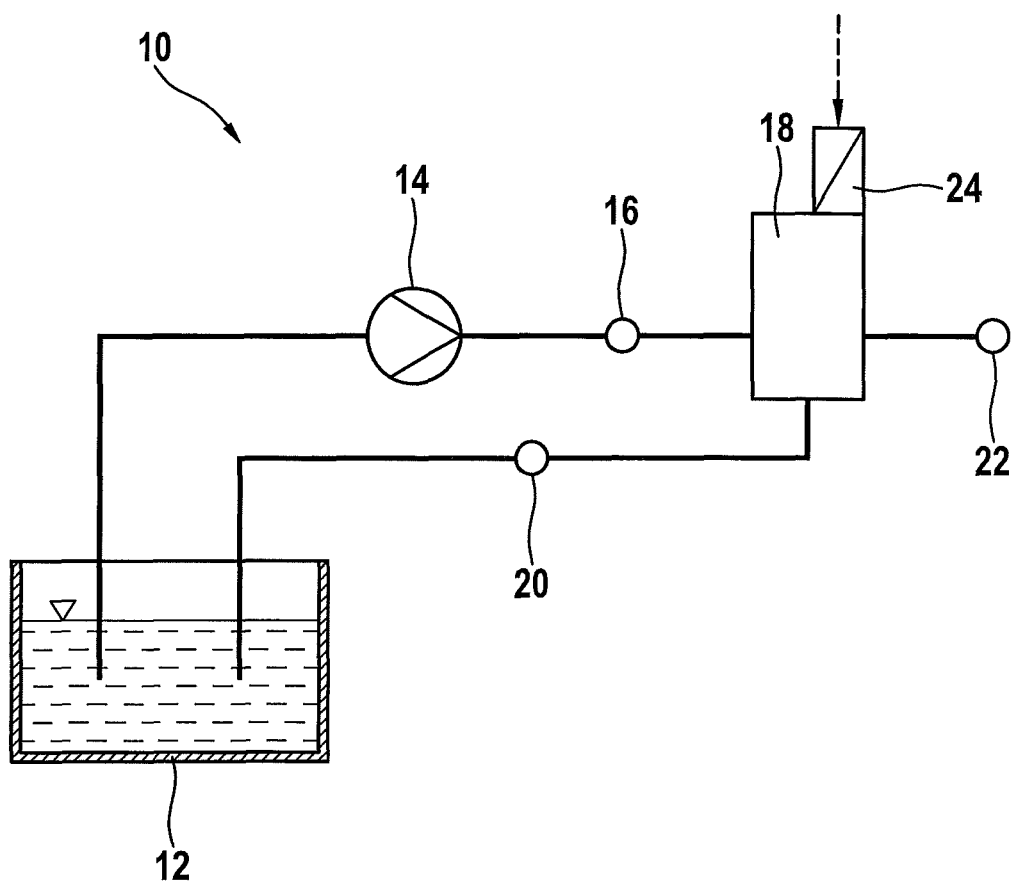
FIG. 1 schematically shows a representation of a hydraulic circuit, in which a pressure control valve according to the present invention is used.

To control automatic transmissions, as they are used, for example, in passenger cars, a hydraulic circuit 10, among other things, is used, of which a pressureless hydraulic oil reservoir 12 and a hydraulic pump 14 are a part. An outlet of the hydraulic pump 14 forms a supply connection 16, to which a pressure control valve 18 is connected.

A return flow from pressure control valve 18 leads to a return flow connection 20, which leads back to hydraulic reservoir 12. Pressure control valve 18 is also connected to a working connection 22, at which the pressure to be controlled by pressure control valve 18 is present. In addition, pressure control valve 18 includes an electromagnetic actuation device 24.

Figure 2:
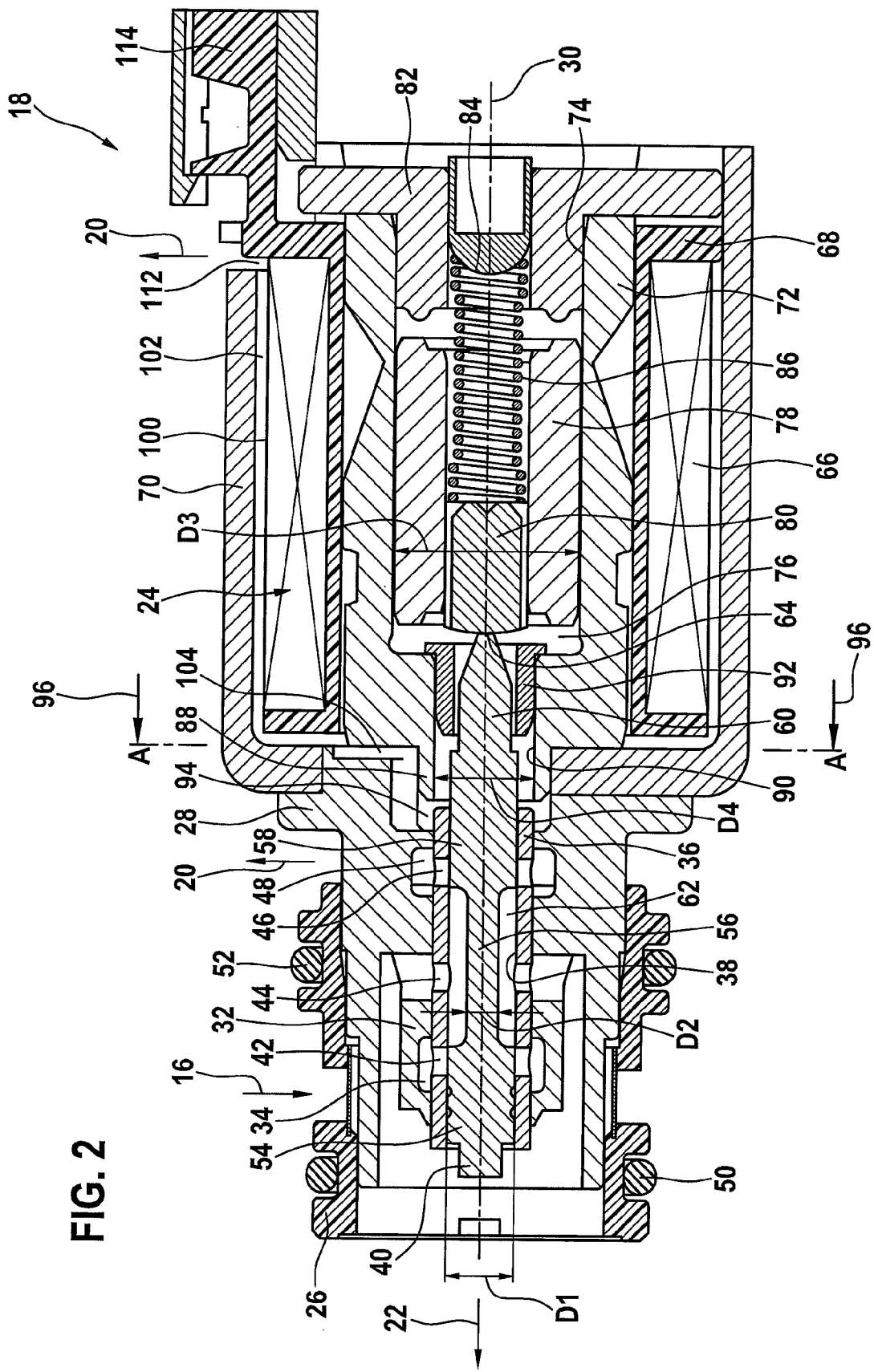
FIG. 2 shows a partial section through a pressure control valve according to the present invention.

FIG. 2 depicts the structure of a pressure control valve 18 according to the present invention. Pressure control valve 18 includes a valve connection element 26, which is slid on to a hydraulic housing 28 and is sealingly connected to hydraulic housing 28. Valve connection element 26, or, respectively, hydraulic housing 28, has a recess (with no reference numeral) situated concentrically to a median longitudinal axis 30 of pressure control valve 18, in which a fastening section 32 is situated. Provided in fastening section 32 is an annulus space 34. Fastening section 32 is mechanically connected at at least one point via its outer circumference to hydraulic housing 28. In the area of this connection, annulus space 34 is also hydraulically connected to supply connection 16. A sliding sleeve 36 is inserted into the concentric recess of hydraulic housing 28. Sliding sleeve 36 has a continuous guide bore 38, which serves to accommodate a control piston 40. Sliding sleeve 36 is inserted into the hydraulic housing up to the area of hydraulic housing 28 facing away from valve connection element 26.

Openings 42, 44 and 46 are located on the circumference of sliding sleeve 36 situated next to one another in the axial direction. The first opening in sliding sleeve 36, referred to hereinafter as supply pressure opening 42, opens guide bore 38 to annulus space 34 and, therefore, to supply connection 16 when control piston 40 is actuated accordingly.

FIG. 2 depicts pressure control valve 18 in the equilibrium position, such that no hydraulic connection exists between annulus space 34 and guide bore 38. This equilibrium position is an intermediate position between the open and the closed end position.

The second transverse bore of sliding sleeve 36, referred to hereinafter as control pressure opening 44, connects guide bore 38 to control pressure connection 22. In particular, during operation of pressure control valve 18, fluid is able to flow via the control pressure opening on fastening section 32, which is not fastened about its entire outer circumference in hydraulic housing 28, in the direction of control pressure connection 22. The third transverse bore, hereinafter called return flow opening 46, establishes a hydraulic connection between guide bore 38 and return flow connection 20. Return flow opening 46 in this case communicates, in particular, with an annulus space 48 situated in hydraulic housing 28, which is hydraulically connected to return flow connection 20.

Two O-rings 50, 52 are provided on the outer circumference of valve connection element 26, which seal control pressure connection 22 outwardly during operation of pressure control valve 18.

Control piston 40 is divided in the axial direction into four adjoining sections 54, 56, 58 and 60. First section 54, to the extreme left in the figure, has a first diameter D1. With this first diameter D1, control piston 40 is guided in guide bore 38.

Second section 56 situated in FIG. 2 approximately centrically in sliding sleeve 36, which is connected to first section 54, has a second diameter D2, which is smaller than first diameter D1 and, thus, is also smaller than the diameter of guide bore 38 in the area of second section 56. This creates an annulus space 62 between sliding sleeve 36 and second section 56 of control piston 40.

Third section 58 connected to second section 56 also has diameter D1 and is guided sealingly, but axially displaceably, in guide bore 38 of sliding sleeve 36. As a result, annulus space 62 is delimited in the axial direction by first section 54 and third section 58.

In fourth and last section 60, control piston 40 has a smaller diameter and tapers conically toward an end face 64.

In the equilibrium position shown in FIG. 2, control piston 40 is situated axially in sliding sleeve 36 in such a way that annulus space 62 communicates with control pressure opening 44. The rim of first section 54 facing second section 56 forms a control edge (with no reference numeral). In addition, the front rim of third section 58 facing second section 56 also forms a control edge (with no reference numeral).

Electromagnetic actuation device 24 is situated in FIG. 2 on the right side of pressure control valve 18. It includes, among other things, an annular coil 66, which is wound around a winding carrier 68.

Coil 66 is surrounded by a magnet housing 70 which contains actuation device 24. Situated inside coil 66 is a pole tube 72. Pole tube 72 includes a first bore 74 having a diameter D3. Bore 74 forms a magnet chamber 76. A sleeve-like magnet armature 78 is inserted within magnet chamber 76 from an open side into bore 74, on the right in FIG. 2. Magnet armature 78 includes an armature bolt 80, which together with magnet armature 78 is connected at at least one point on its outer circumference of magnet armature 78. Also inserted into magnet chamber 76 of pole tube 72 is a pole disk 82 having a sleeve-like section (with no reference numeral) in magnet chamber 76, or, respectively, in bore 74. A coil spring 86 is situated between armature bolt 80 and a support section 84 in the interior of sleeve-like magnet armature 78 and of the sleeve-like section of pole disk 82. Coil spring 86 is supported on the one hand on armature bolt 80 and on the other hand on support section 84. The side of pole tube 72 facing hydraulic housing 28 includes an annular flange section 88, which has a significantly smaller diameter than pole tube 72. In the area of the annular flange section 88, the pole tube includes a second bore 90 having a diameter D4. This bore 90, together with bore 74, forms a stepped through-bore in pole tube 72. A sleeve 92 is inserted from magnet chamber 76 within bore 90. An end face of sleeve 92 facing hydraulic housing 28 forms a stop for control piston 40. A step in control piston 40, which is formed between third section 58 and fourth section 60, cannot be moved further to the right past this stop of sleeve 92, i.e., in the direction of actuation device 24.

Sleeve 92 has an inner diameter, which is larger than the outer diameter of control piston 40 in fourth section 60. Consequently, the magnet chamber is fluidically connected to an annulus space 94 on the magnet side in hydraulic housing 28 via an annulus space formed by fourth section 60 of control piston 40 and sleeve 92.

Figure 3:
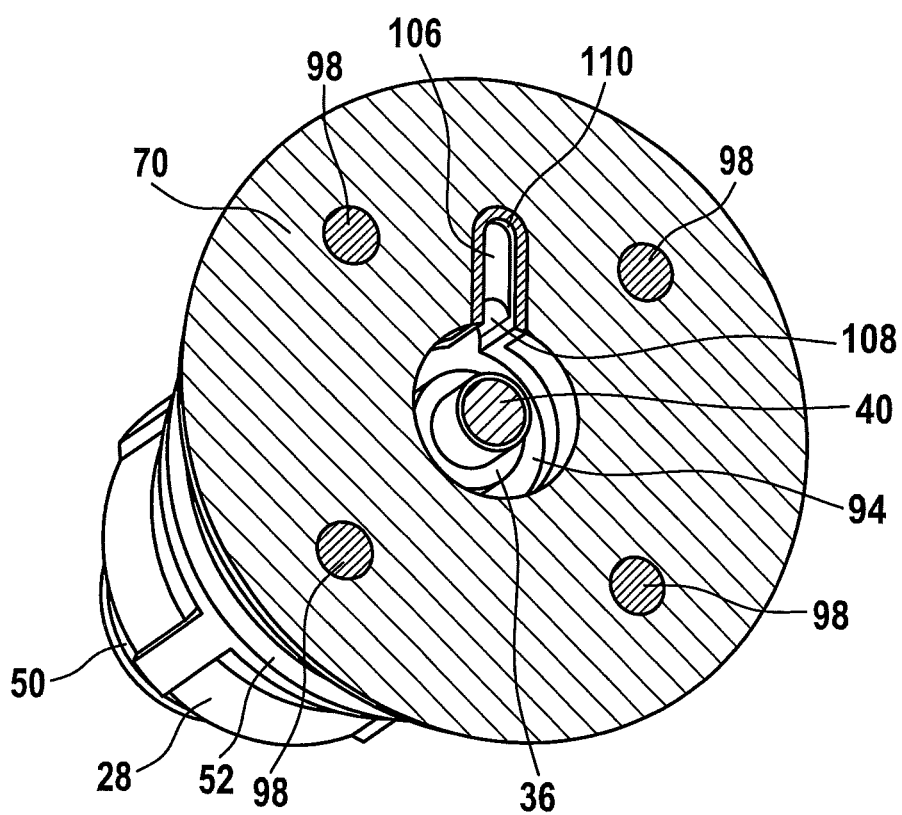
FIG. 3 shows a section along the line A-A in FIG. 2.

FIG. 3 shows a section along the line A-A in FIG. 2 as viewed in the direction of arrow 96. Here, an annulus space 94 in hydraulic housing 28 shown in FIG. 2 is clearly apparent. It is also apparent in FIG. 3 that sliding sleeve 36 protrudes in sections into annulus space 94. Control piston 40 also extends through annulus space 94. Hydraulic housing 28, as is apparent in the section according to FIG. 3, is non-rotatably connected by pins 98 to magnet housing 70.

As shown in FIG. 2, an outer winding layer of coil 66, together with magnet housing 70, delimits a compensating chamber 102. This compensating chamber 102 is fluidically connected to annulus space 94 via a compensating channel 104. Compensating channel 104 in this case is formed by a semi-open groove 106 clearly apparent in FIG. 3, cast in hydraulic housing 28, the cross section of which is approximately semi-circular, and by annular flange 88 of pole tube 72 and an end face of pole tube 72 on the hydraulic side extending perpendicularly to median longitudinal axis 30. The side of compensating chamber 102 facing away from compensating channel 104 includes an opening 112, for example, in the area of a plug breakthrough for an electric plug 114. This opening 112 also communicates with return flow connection 20.

Groove 106, as shown in FIG. 3, extends in sections in an L-shaped configuration in parallel to median longitudinal axis 30 in a section 108, and radially perpendicularly to median longitudinal axis 30 to radially upwardly in a section 110. Thus, compensating channel 104 is formed, in particular, by section 108 and annular flange 88, as well as by section 110 and the end face of pole tube 72.

During operation of the pressure control valve, i.e., when control piston 40 is moved by electromagnetic actuation device 24 into the open position (to the left in FIG. 2, not depicted), then hydraulic oil flows under high pressure from supply connection 16 and via supply pressure opening 42 into annulus space 62, and from there via control pressure opening 44 to working connection 22. Return flow opening 46 in this case is essentially concealed by third section 58 of control piston 40.

If, on the other hand, control piston 40 is situated in a position more to the right, for example, when coil 66 is energized, supply pressure opening 42 is covered by first section 54, and annulus space 62 is therefore essentially separated from supply connection 16. Instead, return flow opening 46 is now connected by annulus space 62 to the control pressure opening, so that working connection 22 communicates with return flow connection 20 via control pressure opening 44, annulus space 62 and return flow opening 46. In this way, the pressure prevailing at working connection 22 may be reduced via return flow connection 20, because ambient pressure prevails there in a first approximation.

If during operation the control piston 40 is now moved from its opened, left position into its closed, right position, a so-called "pumping" of control piston 40 may occur. In this case, movement of the end face 64 of control piston 40 displaces hydraulic oil. The resultant flow may then be diverted via compensating channel 104 into compensating chamber 102. Since compensating chamber 102 is connected to return flow connection 20 via opening 112, flows caused by the movement of control piston 40 may be reduced via compensating chamber 102 in the direction of return flow connection 20. Compensating chamber 102 in this case has a filtering effect. Dirt particles may settle in compensating chamber 102 due to gravity, whereas ferromagnetic particles, which form, for example, due to gear abrasion in an automatic transmission, magnetically adhere to outer winding layer 100 of coil 66. Since compensating channel 104 is, in particular, upwardly oriented during operation, a ventilation of magnet chamber 76 may be ensured, whereby air is able to escape upwardly. In particular, in this case compensating channel 104 may have a hydraulic diameter $d_h = 4\,A/U$ of approximately 0.3 mm to 2 mm. On the one hand, this may then prevent particles which are too large from passing into magnet chamber 76, while on the other hand the ventilating function is not impaired.

Since the fluid displaced from end face 64 of control piston 40 via compensating channel 104 and compensating chamber 102 may flow into return flow connection 20 unpressurized to the greatest possible extent, control piston 40 may carry out its axial movement largely undamped. This results in a particularly configuration of a pressure control valve 18, with which, on the one hand, the ingress of dirt into pressure control valve 18 may be reduced, and on the other hand a largely undamped axial movement of control piston 40 may be ensured.

What is claimed is:

1. A pressure control valve, comprising:
   a hydraulic housing, the hydraulic housing having an end surface facing an armature;
   a magnet housing;
   a control piston situated inside at least the hydraulic housing, the control piston being actuatable by the armature, wherein the armature is situated in a magnet chamber of a pole tube; and
   a working connection at which a pressure to be controlled by the pressure control valve is present:
   wherein:
   the magnet chamber is hydraulically connected via a compensating channel to a compensating chamber provided in the magnet housing,
   the compensating chamber is delimited by a solenoid coil and the magnet housing,
   the compensating chamber is hydraulically connected to an outer housing side of the magnet housing via an opening
   the compensating channel is formed as a groove on the end surface of the hydraulic housing,
   the groove is delimited by the hydraulic housing and an end face of the pole tube facing the control piston, and
   the control piston is moved into a closed position by the pressure present at the working connection.

2. The pressure control valve of claim 1, wherein an end face of the control piston contacts the armature during operation of the pressure control valve.

3. A pressure control valve of claim 1, wherein the groove extends in an L-shaped configuration, at least in sections, in parallel to a median longitudinal axis of the control piston and on an armature side end face of the hydraulic housing on at least in sections radially perpendicularly to the median longitudinal axis of the control piston.

4. The pressure control valve of claim 1, wherein the groove is cast or injection molded into the hydraulic housing.

5. The pressure control valve of claim 1, wherein the compensating channel is situated radially upwardly during operation.

6. The pressure control valve of claim 1, wherein the compensating channel has a hydraulic diameter of 0.3 mm to 2 mm.

7. The pressure control valve of claim 1, wherein the control valve is for an automatic transmission in a motor vehicle.

8. The pressure control valve of claim 1, wherein the compensating chamber is delimited by a lateral surface of a solenoid coil and the magnet housing.

9. The pressure control valve of claim 1, further comprising:
   a supply connection for supplying a fluid to the pressure control valve;
   a return flow connection for a return flow; and
   an electromagnetic device; wherein
   when the electromagnetic device is de-energized, the control piston is in an opened position so that the fluid flows from the supply connection to the working connection, and
   when the electromagnetic device is energized, the control piston is in the closed position so that the fluid flows from the working connection to the return flow connection.

10. The pressure control valve of claim 9, further comprising:
    a spring for generating an opening force, wherein the opening force moves the control piston into the opened position.

* * * * *